United States Patent [19]

Ozawa et al.

[11] Patent Number: 4,899,437
[45] Date of Patent: Feb. 13, 1990

[54] APPARATUS FOR ASSEMBLING ROLLER TYPE UNIVERSAL JOINT AND ROLLER ASSEMBLY UNIT

[75] Inventors: Mituharu Ozawa; Nobuyoshi Nagatsuma; Naofumi Nagata, all of Sayama, Japan

[73] Assignee: Honda Giken Kogyo Kabushiki Kaisha, Tokyo, Japan

[21] Appl. No.: 324,496

[22] Filed: Mar. 16, 1989

[30] Foreign Application Priority Data

Mar. 18, 1988 [JP] Japan .................................. 63-65538

[51] Int. Cl.⁴ .............................................. B23P 21/00
[52] U.S. Cl. ........................................ 29/787; 29/235; 29/281.1
[58] Field of Search ....................... 29/281.1, 771, 787, 29/434, 464, 469, 235, 450; 464/111, 905

[56] References Cited

U.S. PATENT DOCUMENTS

| | | | |
|---|---|---|---|
| 3,230,617 | 1/1966 | Spiess et al. | 29/434 |
| 3,290,754 | 12/1966 | Pitner | 29/434 |
| 3,529,942 | 9/1970 | Pitner | 29/434 |
| 3,722,066 | 3/1973 | Spiess | 29/434 X |
| 3,786,544 | 1/1974 | Ferguson | 29/434 X |
| 4,355,467 | 10/1982 | Albertazzi | 33/517 X |
| 4,364,181 | 12/1982 | Albertazzi | 33/517 |
| 4,540,384 | 9/1985 | Bennett et al. | 464/905 X |
| 4,625,377 | 12/1986 | Kavthekar | 29/434 X |
| 4,704,782 | 11/1987 | Spiess et al. | 29/434 |

Primary Examiner—Mark Rosenbaum
Assistant Examiner—Frances Chin
Attorney, Agent, or Firm—Armstrong, Nikaido, Marmelstein, Kubovcik & Murray

[57] ABSTRACT

An assembly station has plural roller assembling units mounted each aligned with one of the axes of the projections on a spider fitted to a shaft which is held in position at the station. A roller setting jig and an outer member assembling jig are alternately moveable to an assembly position at the station in line with an axis of the shaft. The roller setting jig includes a jig body vertically moveable along the axial direction of the shaft and a setting member on the jig body having holding portions for detachably holding the rollers to be assembled. The outer member assembling jig includes an outer member jig body vertically moveable along the axial direction of the shaft and a chuck member on the jig body for clamping the outer member. Each roller assembling unit includes a unit body moveable along the axis of the respective projection, and a holder for receiving a roller from the roller setting member when the roller jig body is advanced toward the shaft, then centering the roller to be aligned with the axis of the projection and holding it in that centered position whereupon the unit body advances and mounts the roller on the projection. The roller setting jig and the outer member assembly jig can be mounted on a rotary table index-rotated to alternately place them at the assembling position. A roller feeder device and an outer member setting device feed the respective component parts to the respective jigs when they are away from the assembling position.

7 Claims, 11 Drawing Sheets

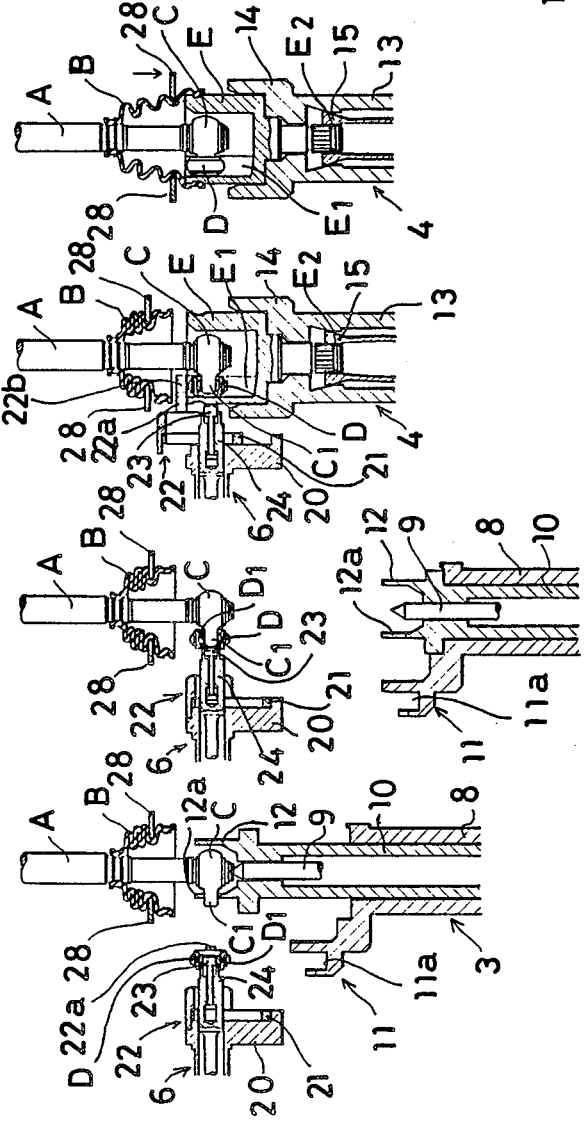

APPARATUS FOR ASSEMBLING ROLLER TYPE UNIVERSAL JOINT AND ROLLER ASSEMBLY UNIT

BACKGROUND OF THE INVENTION

The present invention relates to an assembling apparatus for use in an assembly process for assembling a roller type universal joint such as a tri-pod type constant velocity joint. More specifically, the apparatus is provided for assembling a roller to each of a plurality of projections on an outer periphery of a spider attached to an end of a shaft and then assembling an outer member around the spider. Additionally the invention is directed to a roller assembling unit used in the assembling apparatus.

For assembling a roller of this kind and an outer member, it has been usual to manually mount a roller to each of the projections of the spider and then, while maintaining the attitude of the roller, manually orient an outer member in such a manner that it may be so adjusted in phase as to have the roller inserted into a roller-rolling groove on the inner periphery thereof.

The manual assembling process such as one described above has a low productivity, so that an automation of the assembling operations is much desired.

In this case, if the assembling of the roller is performed at one station and that of the outer member at the other, the roller can fall off from the spider while the shaft is in transit. For this reason, it is necessary to arrange on a single station the number of roller assembling means corresponding to that of the projections of the spider, outer member assembling means, and means for setting the roller to each of the roller assembling means. The disposition of these so as not to interfere with one another has been a problem to solve for materialization of the automation.

OBJECTS AND SUMMARY OF THE INVENTION

It is therefore a first object of the present invention to provide through solving the afore-said problem, an assembling apparatus which is designed to automatically perform assembling of a roller and an outer member.

It is a second object of the present invention to provide a roller assembling unit which has an attitude maintaining function to meet the need for maintaining a roller at a given attitude until the roller has been inserted into a roller-rolling groove in an outer member because, in a roller-type universal joint, the roller should be assembled so as to be slidable and tiltable with respect to the projection.

To attain the above first object, the invention provides an apparatus for assembling a roller type universal joint in which a roller is mounted onto each of a plurality of projections provided on the outer periphery of a spider fitted to one end of a shaft and then an outer member is mounted in place around the spider. The apparatus includes an assembling station for setting the driving shaft in place. A roller assembling unit is mounted on the assembling station and disposed at each of plural locations around the spider which are found in the direction aligned with one of X axes, each of said X axes being constituted by a radially extending line with which each projection of the spider is aligned. A roller setting jig and an outer member assembling jig are mounted on the assembling station and are alternately movable to an assembling position located on the same axial line as that of the shaft A. The roller setting jig includes a roller jig body movable back and forth along the axial direction of the shaft and a roller setting member mounted on the roller jig body and having holding portions so disposed at a plurality of locations around the roller setting jig and along the X-axis direction as to hold the roller detachably. The outer member assembling jig includes an outer member jig body movable back and forth along the axial direction of the shaft and a chuck member mounted on the outer member jig body for clamping the outer member. The roller assembling unit comprises a unit body movable back and forth along the X-axis direction and a holder means mounted on the unit body for receiving a roller from the roller setting member held by each of the holding portions thereof when the roller jig body of the roller setting jig is advanced toward the shaft, then centering the roller in such a way as to be aligned with the X axis and holding it in that centered position.

In the case of the foregoing, it is desirable to arrange the apparatus as described in the following: A pair each of the roller setting jigs and the outer member assembling jigs are disposed alternately on a rotary table having a phase difference of 90 degrees from the neighboring one. The rotary table is index-rotated by 90 degrees at a time, so that both jigs are rotated alternately to the assembling position by the index-rotation of the rotary table. A roller feeder is provided for feeding and setting a roller to each of the holding portions of the roller setting member of the roller setting jig that has been rotated to reach a roller setting position. An outer member setting device is provided for feeding and setting an outer member to the outer member setting jig that has been rotated to reach an outer member setting position. The roller setting position is a rotated position having a phase difference of 90 degrees or 180 degrees with respect to the assembling position. The outer member setting position is another rotated position having a phase difference of 180 degrees or 90 degrees also with respect to the assembling position, so that feeding of the rollers and the outer members can be performed automatically.

It is usual to attach the spider to an end portion of the shaft through a spline engagement and a phase of the position at which the spider is attached with respect to the shaft can be varied within the range of one pitch of the splines depending on the phase alignment between the splines on the inner periphery of the spider and those on the outer periphery of the shaft. It is therefore desired to perform a phase alignment for the spider at the assembling station.

Therefore, the invention further includes arranging the apparatus such that, in order for the roller setting jig to be able to serve concurrently as a phase alignment means for the spider, a guide member is provided on the roller jig body of the roller setting jig which comes to engage with the spider and makes each of the projections thereof aligned with the X axis when the jig body is advanced toward the shaft.

In this case, a guide shaft having a central pin inserted therein for sinking movement against force of a spring and engageable in a central hole in an end face of the shaft may be inserted through the roller jig body of the roller setting jig so as to be slidable forwardly in the axial direction of the shaft on the jig body. The guide member may be attached to the guide shaft.

Desirably, a boot mounting unit may be provided on the assembling station, for gripping a boot previously assembled to the shaft and then fitting the diametrically larger portion of the boot over an outer periphery of the open end of the outer member, so that a boot is fitted over the outer member thereby after the outer member is assembled to the shaft, thus keeping the outer member in place by the boot against possible slipping off.

The present invention also provides a roller assembling unit designed to achieve the second object. This roller assembling unit comprises a unit body movable back and forth in the X-axis direction, and a holder means having a roller holder and a pin for centering and holding the roller so as to be aligned with the X axis. The roller holder is mounted on the unit body and is slidable along the axial line of the shaft. A containing portion as provided on the roller holder which permits the projection to be inserted thereinto from the inward side in the X-axis direction and the roller to be contained therein in such a manner as to be withdrawable in the axial direction of the shaft. The pin is insertable into the inner member of the roller, and also insertable into the containing portion from the outside in the X-axis direction.

In this case, a push rod that can be put in contact with an end surface of the inner member of the roller is provided on the unit body so as to be movable back and forth in the X-axis direction. The pin may be fitted to the leading end of the push rod so as to be urged by a spring inwardly in the X-axis direction.

The operation of the present invention will now be described.

First, the roller setting jig is moved to the assembling position, then the roller jig body thereof is advanced along with the guide shaft toward the shaft. For this operation, the unit body of each roller assembling unit is retreated to remain at a standby position located outwardly in the X-axis direction, the standby position being such that the containing portion of the roller holder is aligned thereat with a path of movement of each holding portion of the setting member attached to the jig body, so that advancement of the jig body causes the roller held on each holding portion to get into the containing portion. Then, when the center of the roller has become aligned with the X axis, the pin provided on the roller assembling unit is caused to stick out for insertion into the inner member of the roller. During this operation, there are some occasions in which the inner member of the roller is inclined with respect to the X axis. In such a case, the pin may not be smoothly inserted into the inner member. If the pin is attached to the push rod and urged by a spring inwardly in the X-axis direction, however, the push rod advances to abut on the end surface of the inner member while the pin which is interfering with the inner member is pushed into the rod against the spring. This corrects the posture of the inner member to be aligned with the X axis, so that the pin urged by the spring is smoothly inserted into the inner member.

In addition, the advancing movement of the roller jig body causes the guide member at the leading end of the guide shaft moving forward in unison therewith to engage with the spider, thereby adjusting the spider in phase for each of the projections thereof to be aligned with the X axis.

Next, the roller jig body is moved back while keeping the guide shaft at the advanced position, causing the roller setting member to be separated from the roller assembling unit. In this condition, the spider is bound by the guide member and remains at the predetermined phase of alignment while the roller is contained in the containing portion of the roller holder of the roller assembling unit and held therein with the roller centered by means of the pin. Thereafter, with the unit body advanced inwardly in the X-axis direction, the projection of the spider is inserted into the containing portion from the inward side in the X-axis direction and further into the inner member of the roller held in the containing portion while pushing the pin against the spring outwardly in the X-axis direction.

Then, the guide shaft is retreated, causing the guide member to be separated from the spider. The guide shaft and the roller jig body are returned to their original positions. Thereafter, the roller setting jig is moved from the assembling position, and the outer member assembling jig is moved to the assembling position, and the outer member jig body thereof is advanced toward the shaft.

The outer member is set on the outer member jig body in advance in a phase in which the roller-rolling groove in the inner periphery of the outer member is positioned along the X-axis direction. The outer member is bound by the chuck member to remain in that phase.

Further, the roller is attached to the projection while remaining contained in the containing portion, and the posture of the roller is kept consistent.

Thus, with the forward movement of the outer member jig body, the open end of the outer member first comes to abut on the roller holder of the roller assembling unit such that the containing portion is joined with the roller-rolling groove of the outer member in the axial direction of the shaft. Thereafter, the roller holder is pushed by the outer member and moved in the axial direction of the shaft, the roller is removed out of the containing groove and inserted into the roller-rolling groove. The assembling of the outer member is performed in this manner. Furthermore, the push rod in the roller assembling unit is retreated in advance in order not to interfere with the outer member.

In this apparatus, a pair each of the roller setting jigs and the outer member assembling jigs are disposed alternately on the rotary table so as to have a phase difference of 90 degrees from the neighboring one. Alternatively, it is possible to dispose one each of both jigs on the table so as to have a phase differences of 180 degrees from each other so that both jigs may be moved alternately to the assembling position as the table is index-rotated by 180 degrees at a time. In this arrangement, however, it is necessary to feed and set each of the rollers and the outer members to the corresponding jig at a common setting position having a phase difference of 180 degrees with respect to the assembling position. Such is very difficult for the feeder or supplying device to carry out automatically.

Compared with the above alternative, the apparatus of the present invention enables the roller and the outer member to be automatically fed to and set on the corresponding roller setting and outer member assembling jigs at the separate setting positions by the separate feeders, respectively.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 9(a) through FIG. 9(e) are explanatory diagrams for explaining the operation of the assembling apparatus;

DETAILED DESCRIPTION OF PREFERRED EMBODIMENT

Figure 15:
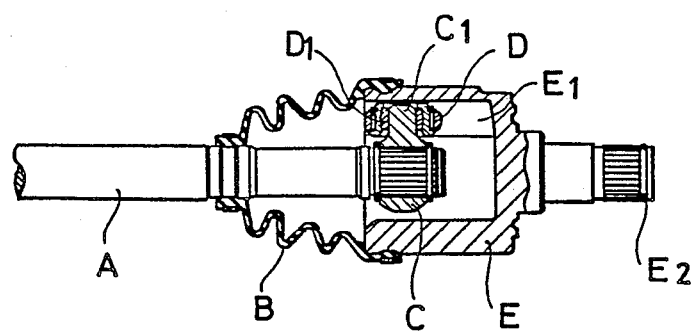
FIG. 15 is a longitudinal sectional view of a universal joint.

The accompanying drawings show one embodiment of the present invention in which an apparatus for assembling a tri-pod type constant velocity joint such as one shown in FIG. 15 is arranged such that a boot B and a spider C having a projection C1 at each of three peripheral places are assembled to an end of a shaft A such as a driving shaft for a vehicle and thereafter a roller D is mounted onto each projection $C^1$ while an outer member E having a roller rolling groove E1 at each of peripheral three places on its inner peripheral surface is attached so as to be disposed around the spider C. In the drawings, the reference character E2 designates a set ring fitted to a shank of the outer member E.

Figure 1:
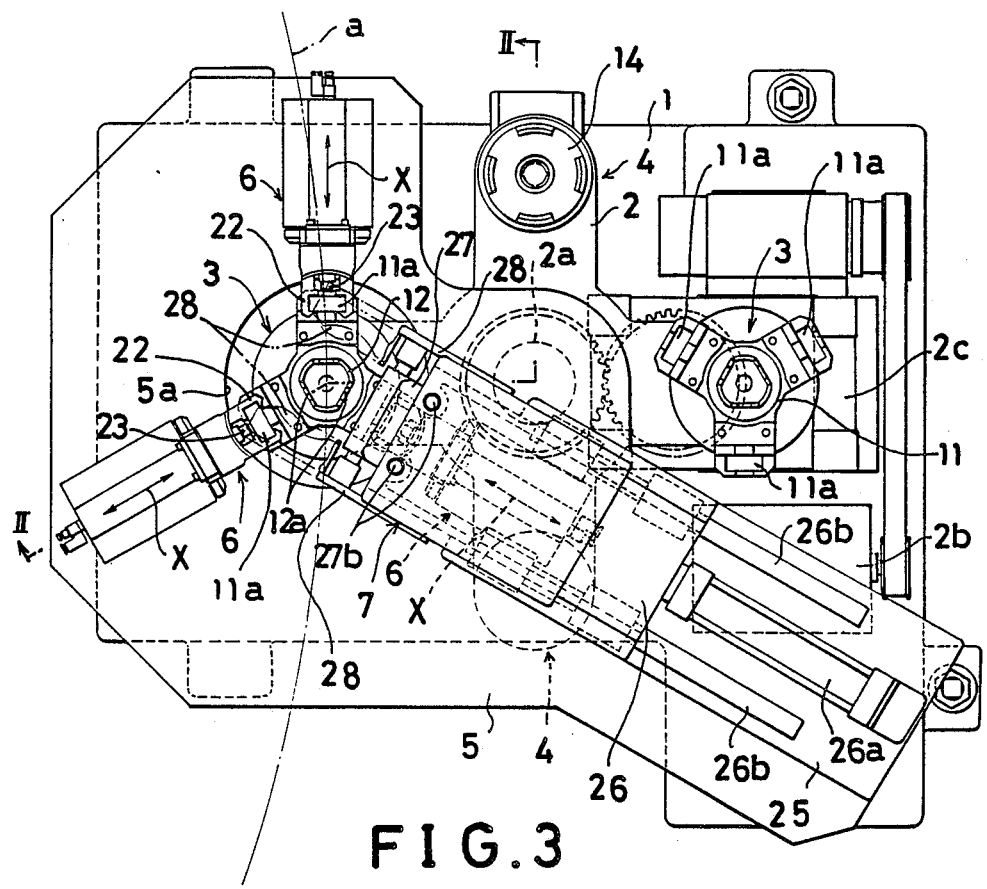
FIG. 1 is a plan view of an assembling apparatus according to one embodiment of the present invention.
Figure 2:
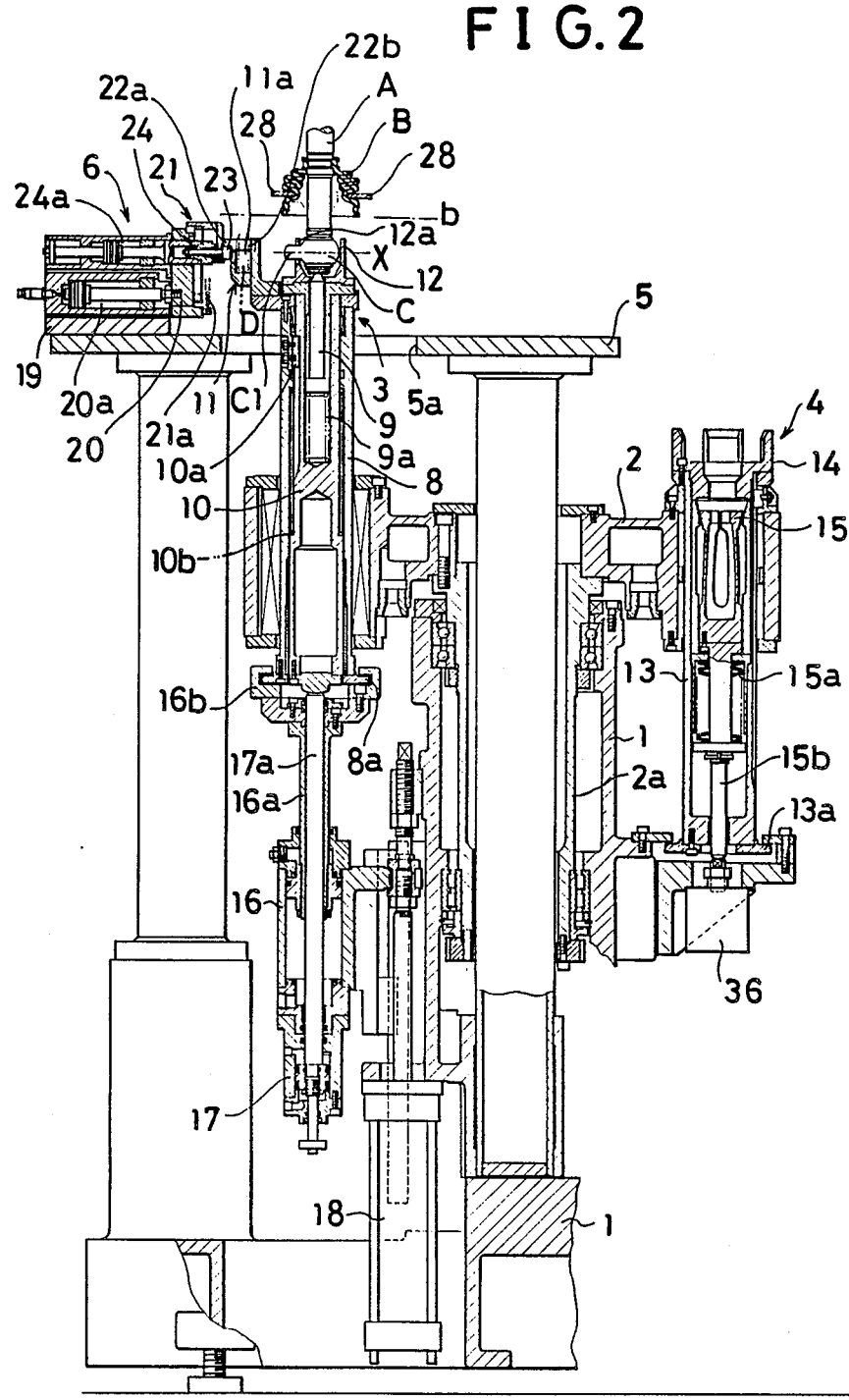
FIG. 2 is a sectional side view taken along a line II—II in FIG. 1.

The assembling apparatus is installed in an assembling station in which the shaft A is held set in a vertical posture with the end thereof having the spider C attached thereto facing downward, the details thereof being as shown in FIGS. 1 and 2. A rotary table 2 is pivotally supported on a base 1 through a vertical rotary shaft 2a. A pair of roller setting jigs 3 and a pair of outer member assembling jigs 4 are mounted on the rotary table 2 and disposed alternately at intervals of 90°, so that both jigs 3 and 4 may be moved alternately to an assembling position just below the shaft A as the rotary table 2 is index-rotated 90° at a time, through a reduction gear 2c by a motor 2b. A holder base 5 is positioned above the rotary table 2 and provided with a through window 5a formed to be concentric with the shaft A. Taking as an X-axis a radially extending line with which each of the projections C1 of the spider C is to be aligned, roller assembling units 6 are disposed on the holder base 5 at three peripheral places adjacent through window 5a located to be aligned with the directions of these X axes. A boot-mounting unit 7 is mounted on one side of a periphery of the through window 5a.

Figure 3:
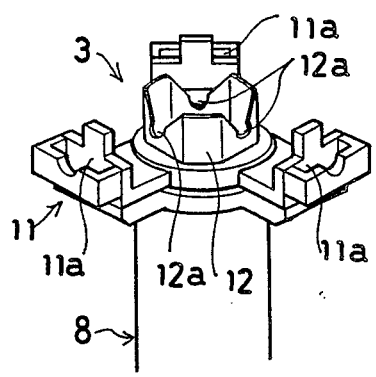
FIG. 3 is a perspective view of an upper end portion of a roller setting jig.

The roller setting jig 3 is arranged as follows. A roller jig body 8 is inserted through the rotary table 2 and is vertically movable. A center pin 9 engageable with a center hole on the lower end surface of the shaft A is inserted in a guide shaft 10 and is movable downwardly against the biasing of a spring 9a far enough to disappear into the guide shaft. The guide shaft 10 is inserted in the roller jig body 8 and is movable upward against the biasing of a spring 10b. The guide shaft 10 is locked against rotation by a key 10a. As shown in FIG. 3, a roller setting member 11 is mounted on the upper end of the roller jig body 8 and has pocket projections 11a at three peripheral places thereof located in the directions of the X axes to detachably hold rollers D upwardly. A guide member 12 is attached to the upper end of the guide shaft 10 and has V-shaped notches 12a at three peripheral places of its cylindrical body surrounding a body of the spider C so as to receive the corresponding projections C1 while making phase adjustment necessary to have the projections aligned with the X axes.

The outer member assembling jig 4 comprises an outer member jig body 13 inserted through the rotary table 2 and vertically movable. A receiver 14 is mounted on the upper end of the outer member jig body 13 to receive the outer member E. A collet 15 is mounted inside the body 13 and urged by a spring 15a toward a lower closing side, the collet 15 being provided for clamping the shank of the outer member E.

A common cylinder arrangement is provided below the assembling position for operating both jigs 3 and 4. The cylinder arrangement is comprised of first or upper and second or lower cylinders 16 and 17 arranged vertically, and a third cylinder 18 for moving the cylinders 16 and 17 upwardly and downwardly. The first or upper cylinder 16 includes a piston rod 16a which has an engaging element 16b mounted on its upper end adapted to receive flanges 8a, 13a on the lower end of each of the jig bodies 8, 13 of each of the jigs 3 and 4 in such a way that the flange 8a, 13a may be detachable in the turning direction of each of the jigs 3 and 4, so that each of the jig bodies 8 and 13 may be vertically moved by the piston rod 16a. The second or lower cylinder 17 has a piston rod 17a inserted through the piston rod 16a of the first cylinder 16, so that the piston rod 17a may be opposed to the lower end of the guide shaft 10 when the roller setting jig 3 has been moved to the assembling position, and to the lower end of an operating rod 15b depending from the collet 15 when the outer member assembling jig 4 has been moved to the assembling position.

Figure 4:
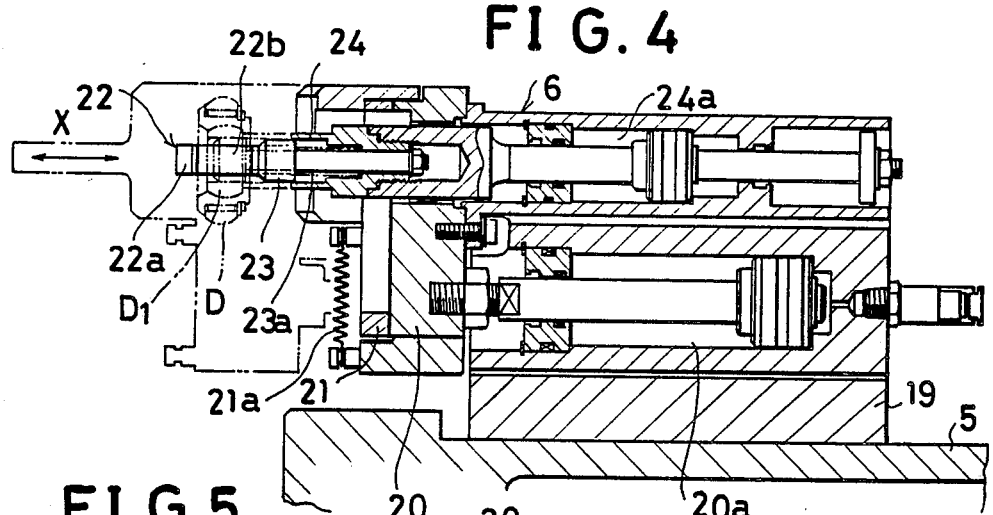
FIG. 4 is a sectional side view of a roller assembling unit.
Figure 5:
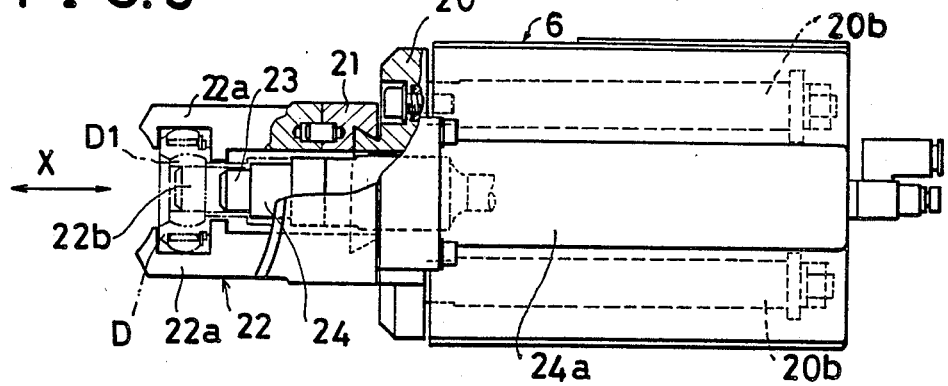
FIG. 5 is a plan view thereof.
Figure 6:
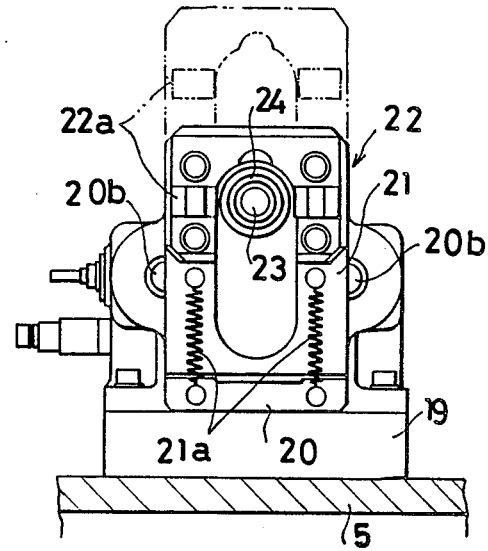
FIG. 6 is a front view of the roller assembling unit.

As shown in FIGS. 4 to 6, each roller-assembling unit 6 comprises a base frame 19 fixedly attached to the holder base 5, having a unit body 20 mounted on the base frame 19. The unit body 20 is advanced and retreated in the X-axis direction by a means for moving which includes a cylinder 20a and at least one guide bar 20b. A slide plate 21 is mounted on the unit body 20 and is movable upwardly against a spring 21a. A roller holder 22 is attached to the slide plate 21. The roller holder 22 has a containing portion 22b between the front ends of a pair of claw pieces 22a, 22a capable of not only receiving the projection $C^1$ of the spider but also containing the roller D in a vertically detachable fashion. A pin 23 which can be inserted into the inner member D1 of the roller D is slideably mounted in a push rod 24 and is able to move backwardly against the biasing of a spring 23a far enough to disappear thereinto. The push rod 24 is mounted on the front end of the unit body 20 and is movable by a means for moving including a cylinder 24a toward and away from the containing portion 22b in the X-axis direction. The inward advancing movement of the push rod 24 in the X-axis direction causes the pin 23 to project into the containing portion 22b for insertion into the inner member D1 of the roller D. At the same time, this movement causes the front end of the push rod 24 to abut against an end surface of the inner member D1.

Figure 7:
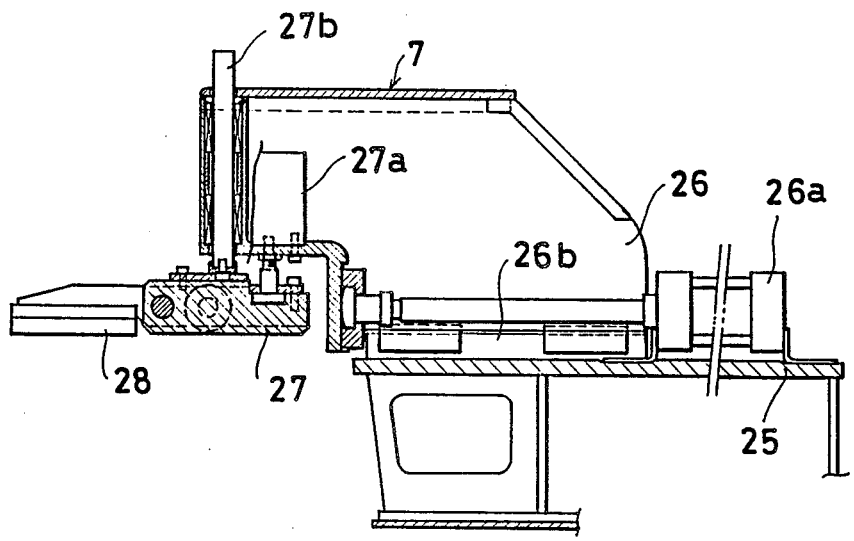
FIG. 7 is a sectional side view of a boot mounting unit.

The boot-mounting unit 7 comprises, as shown in Figs. 1 and 7, a base frame 25 fixedly attached to the holder base 5. A movable frame 26 is mounted on the base frame 25 and can be moved by a means for moving including a cylinder 26a toward and away from the shaft A along a guide rail 26b. A tool holder 27 is vertically suspended by guide bars 27b on the movable frame 26 and is movable by a means for moving including a cylinder 27a. A pair of clamp arms 28, 38 are attached to the holder 27 for holding the boot B therebetween and are opened and closed by the operation of a cylinder (not shown).

Figure 8:
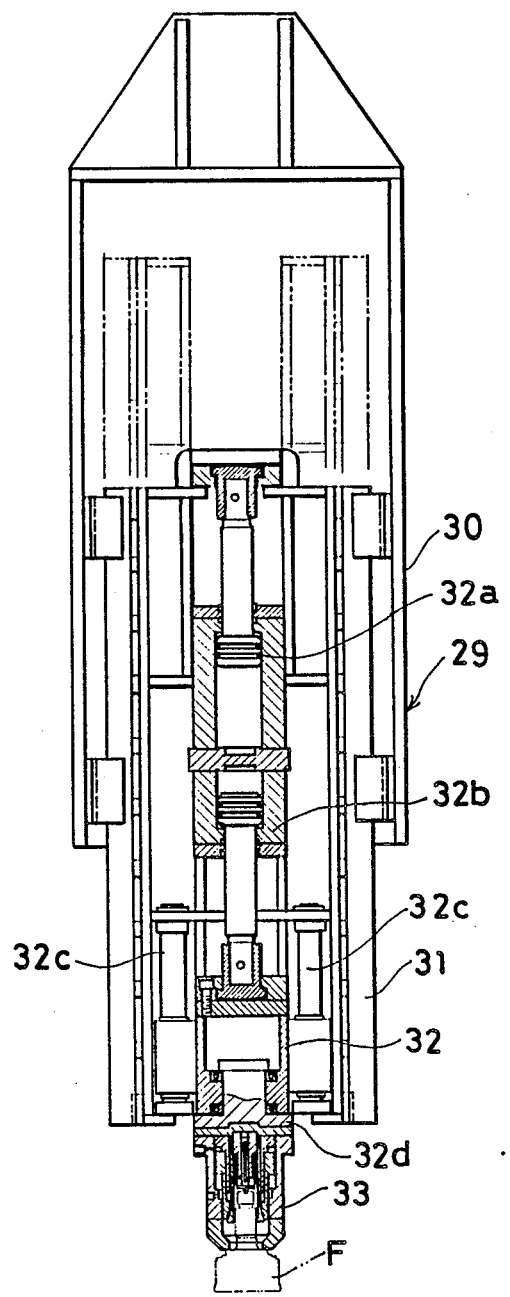
FIG. 8 is a sectional side view of a back-up unit provided above an assembling station.

It should be noted that the shaft A is conveyed along an annular conveying passage to the assembling station while being held in a vertical posture by a carrier (not shown) and hence, the level at which the shaft A is conveyed is set higher than that of the roller-assembling unit 6, as indicated by b in FIG. 2, so that the shaft A cannot interfere with the roller-assembling unit 6 located at a position overlapping a locus a (FIG. 1) of conveying of the shaft A. After stopping the shaft A at the predetermined position, a bell type constant velocity joint F previously attached to the upper end of the shaft A is gripped by a back-up unit 29 provided above the assembling station, such as shown in FIG. 8, and the shaft A is pushed down by the back-up unit 29 to a position in which the projections C1 of the spider C are level with the pins 23 of the roller-assembling units 6.

The back-up unit 29 comprises a stationary frame 30, a lift frame 31 mounted on the stationary frame 30 and vertically adjustable in position according to the type of the shaft A, a tool holder 32 mounted on the lift frame 31 and moved vertically along a guide bar 32c by operation of two upper and lower cylinders 32a and 32b, and a chuck member 33 for gripping the joint F of the upper end of the shaft A. The chuck member 33 is attached to a lower surface of a support member 32d pivotally supported on the holder 32, so that operation of the upper cylinder 32a causes the chuck member 33 to be lowered to a position for gripping the joint F found at the conveying level, while operation of the lower cylinder 32b causes the shaft A to be pushed down from the conveying level.

Description will now be made of a procedure for assembling the roller D and the outer member E according to the present embodiment.

First, the roller setting jig 3 where the roller D has been inserted in each pocket portion 11a of the setting member 11 by a roller feeder 34 which is to be discussed later is moved to assembling position while the piston rod 16a of the first cylinder 16 is kept in its raised position, so that the engaging element 16b is engaged with the flange 8a on the lower end of the jig body 8. Then, the piston rod 18a of the third cylinder 18 is raised to push the jig body 8 upwardly along with the guide shaft lo to the predetermined assembling level.

In this case, the unit body 20 of each of the roller assembling units 6 is retreated to a standby position outward in the X-axis direction, so that the containing portion 22b of the roller holder 22 may face on a locus of lifting up of each pocket portion 11a. According to the foregoing operation (FIG. 2), the lifting up to the assembling level of the jig body 8 causes an upper half of the roller D in each pocket portion 11a to be inserted into the containing portion 22b and the center of the roller to be aligned with an axial line of the pin 23, i.e., the X axis.

Next, the shaft A is pushed down from the conveying level by the back-up unit 29. This operation causes the shaft A to be centered by the central pin 9 and each of the projections C1 of the spider C to be inserted into one of the notches 12a of the guide member 12, so that the spider C is adjusted in phase for each of the projections C1 to be aligned with the X axis, thus achieving a state shown in FIG. 2. The rotation of the shaft A attendant on such adjustment in phase is allowed through the rotation of the support member 32d of the back-up unit 29.

During this operation, the movable frame 26 of the boot mounting unit 7 is advanced to an operative position closer to the shaft A to clamp the boot B by the clamp arms 28 and then, the tool holder 27 is raised to tuck the boot B up.

Then, the push rod 24 of each of the roller assembling units 6 is advanced inwardly in the X-axis direction by the cylinder 24a so as to insert the pin 23 into the inner member D1 of the roller D in each pocket portion 11a.

Now, the inner member D1 of the roller D is assembled to be tiltable relative to the roller D so as to permit tilting of the roller D with respect to the projection C1, and in some cases, this brings forth a state in which the inner member D1 is slanting with respect to the X axis. In such a case, the push rod 24 advances while pushing the pin 23 fully thereinto against the spring 23a due to interference with the pin by the inner member D4 to be unable to advance any further. When the front end of the push rod 24 comes in contact with an end surface of the inner member D1, the orientation of the inner member is corrected in posture as to be in alignment with the X axis, whereupon the pin 23 is inserted into the inner member D1 as it is so urged by the spring 23a.

Next, the piston rod 16a of the first cylinder 16 is lowered to pull the jig body 8 down by a predetermined amount of stroke and be positioned as shown in FIG. 9(a). In this instance, each roller D is contained and held in a given posture in the containing portion 22b of each roller-assembling unit 6 while remaining centered by the pin 23 so as to be aligned with the X axis. Further, the spider C is held in a phase-adjusted state by the guide member 12 because the lowering movement of the guide shaft 10 is blocked by the piston rod 17a of the second cylinder 7 abutting against the lower end of the guide shaft 10.

Then, the unit body 20 of each roller assembling unit 6 is advanced inwardly in the X-axis direction. This causes the inner member D1 of the roller D held in the containing portion 22b to be slid over the projection C1 from the inward side in the X-axis direction and further causes the pin 23 to be pushed out of the inner member D1 against the spring 23a, so that the roller D is assembled onto the projection C1. Then, the piston rod 18 is lowered to pull the guide shaft 10 down along with the jig body 8 and attain a state as shown in FIG. 9(b).

Subsequently, the rotary table 2 is rotated by 90° to move the outer member assembling jig 4 to the assembling position while carrying the outer member E set in advance in the predetermined phase by an outer member feeder 35 which will be described hereinafter.

The flange 13a of the jig body 13 is engaged with the engaging element 16b of the piston rod 16a of the first cylinder 16 located at its uppermost raised position. Then, with the push rod 24 of the individual roller assembling unit 6 retreated outwardly in the X-axis direction, the piston rod 18a of the third cylinder 18 is raised to move the jig body 13 up to a predetermined assembling level, as shown in FIG. 9(c).

During this operation, the outer member E remains clamped and held by the collet 15 in an alignment wherein the roller-rolling grooves E1 in its inner periphery are positioned in alignment with the X-axis directions. When the upward movement of the jig body 13 causes the open end of the outer member E to abut against the roller holder 22 of the individual roller assembling unit 6, the containing portion 22b of the holder 22 is vertically mated with the roller-rolling groove E1. Thereafter, the outer member E acts to push up the roller holder 22 in unison with the slide plate 21. The roller D is inserted into the roller-rolling groove E1 from the containing portion 22b while remaining held in a given posture, thereby carrying out the assembling of the outer member E.

Then, the unit body 20 of each roller-assembling unit 6 is retreated to the standby position and thereafter, as shown in FIG. 9(d), the clamp arms 28 of the boot mounting unit are lowered by the movement of the clamp holder 27 to fit the diametrically larger end of the boot B over the open end of the outer member E. The clamp arms 28 are then opened and retreated by the movement of the movable frame 26, and further, the piston rod 17a of the second cylinder 17 is raised to push the collet 15 up by the rod 17a and open it. In this condition, the piston rod 18a of the third cylinder 18 is lowered to move the jig body 13 downwardly away from outer member E. The shaft A is pulled up to the conveying level by means of the back-up unit 29, thus attaining a state as shown in FIG. 9(e) to complete the assembling operation.

Figure 10:
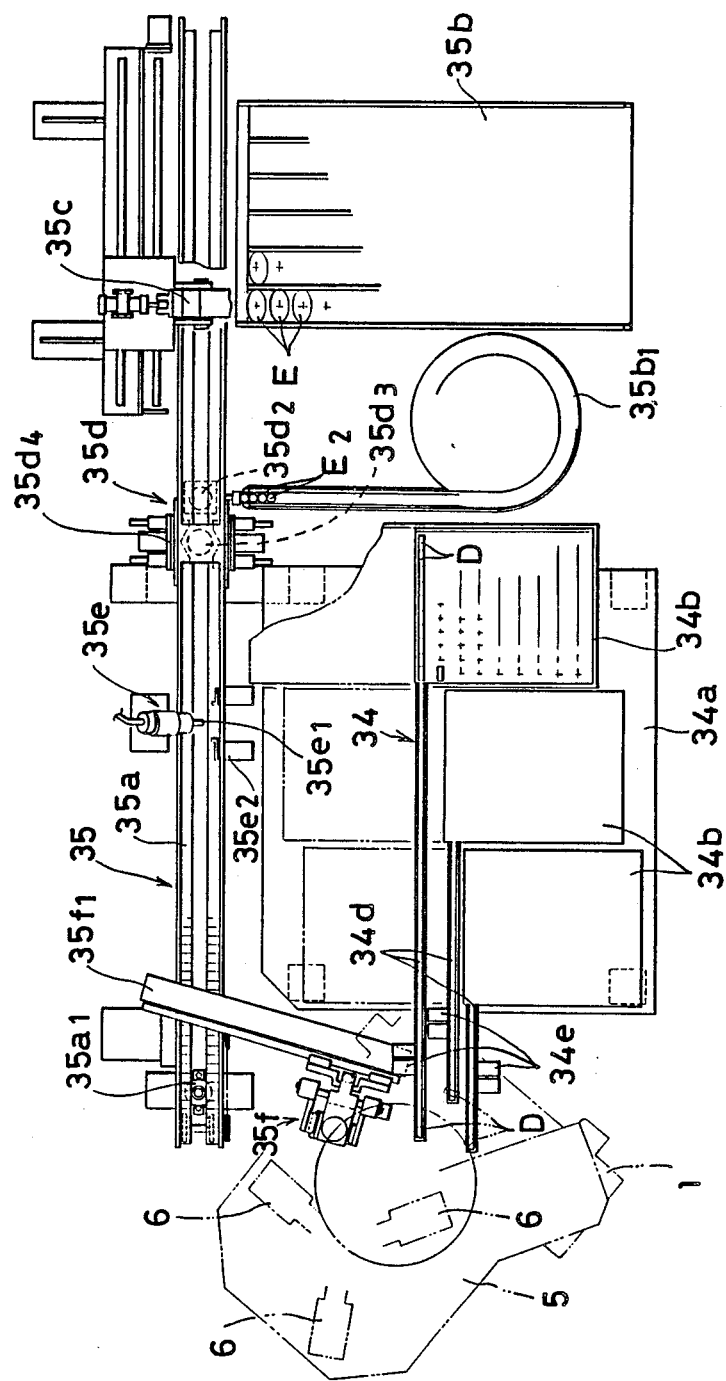
FIG. 10 is a plan view of roller and outer member feeders.
Figure 11:
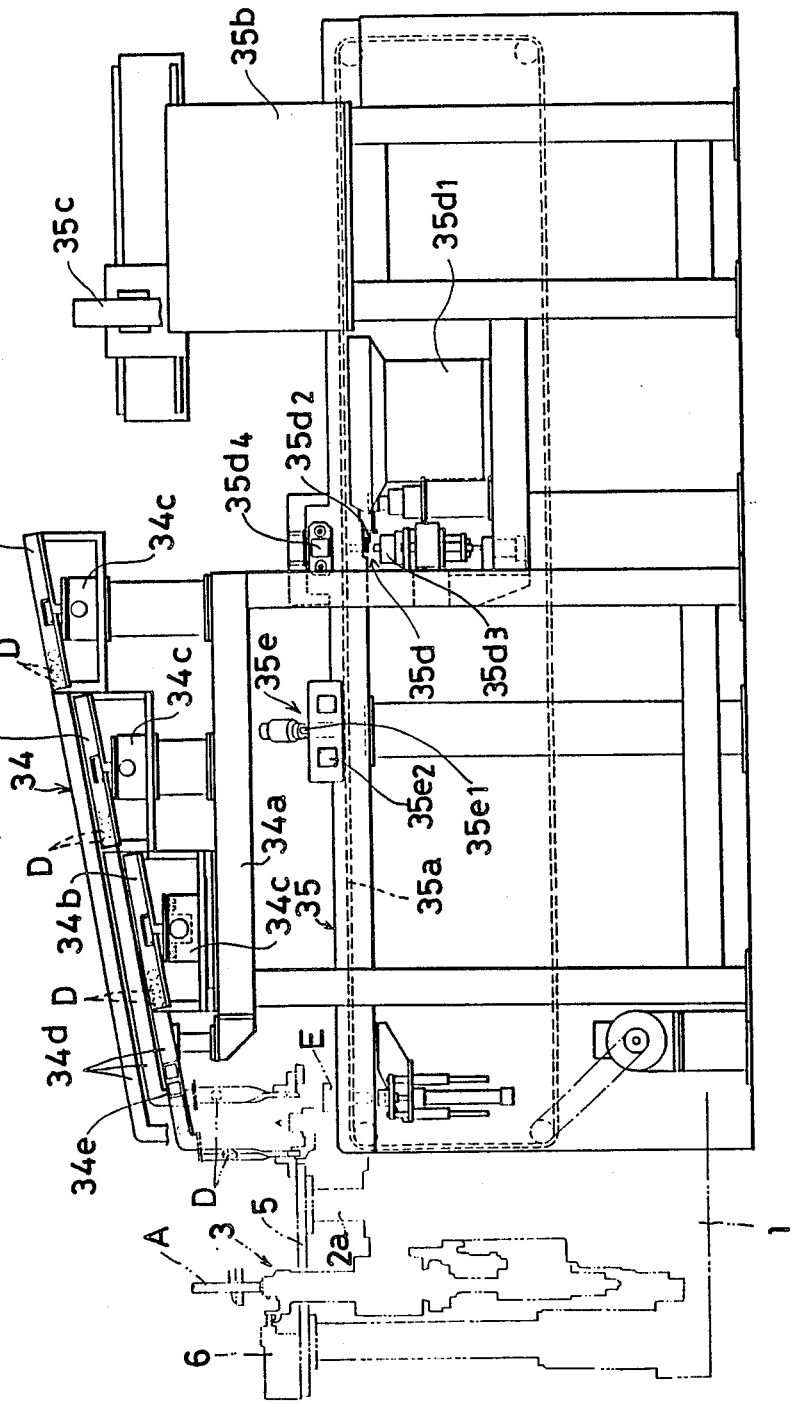
FIG. 11 is a side view of the feeders.

The details of the feeders 34 and 35 are as shown in Figs. 10 and 11. The roller feeder 34a comprises a holder base 34 disposed on one side of the assembling station, three pallets 34b which contain rollers D arranged in a plurality of lateral rows mounted on the holder base 34a in such a way that they may be individually fed intermittently in the lateral direction by corresponding feed mechanisms, and three chutes 34d corresponding to the three pallets 34b. The intermittent feeding causes one row of the rollers D on each pallet 34b to be delivered onto each chute 34d. A front end of each chute 34d is bent downwardly in a roller setting position offset in phase by 180° from the assembling position, so that when the roller setting jig 3 that has been moved to the roller setting position is pushed up by means of a cylinder (not shown), the lower ends of the chutes 34d may be aligned with the corresponding pocket portions 11a. The rollers D are delivered one by one by a delivering mechanism 34e provided on the way of each chute 34d so as to be dropped into each pocket portion 11a.

The outer member feeder 35 is comprised of a conveyor 35a for conveying the outer members E, takeout device 35c for taking out the outer members E one by one from a stocker 35b to put them onto the conveyor 35a, a set ring E2 assembling means 35d and a grease injector 35e which are provided on the way of the conveyor 35a. A setting means 35f is provided for setting the outer member E on the outer member assembling jig 4 which has been moved to the outer member setting position offset in phase by 90° with respect to the assembling position.

The set ring assembling means 35d is designed to set the set ring E2 supplied from a part feeder $35d_1$ on a press-in jig $35d_3$ through a clamping device $35d_2$ which is turnable and movable upward and downward and then to raise the press-in jig $35d_3$ with the outer member E on the conveyor 35a positioned by a positioning means $35d_4$ for pressing the set ring E2 into the shank of the outer member E. The injector 35e is designed to inject grease into the outer member E positioned by the positioning means $35e_2$ through a nozzle $35e_1$ facing on the conveyor 35a.

Figure 12:
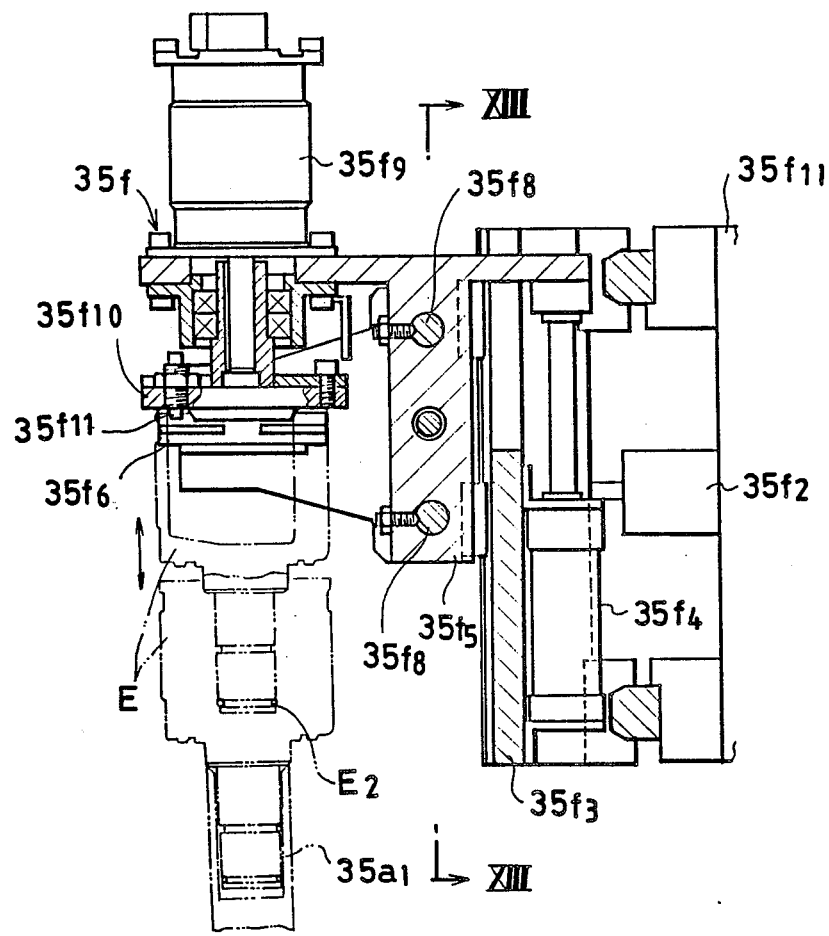
FIG. 12 is a sectional view of an outer member setting means provided on the outer member feeder.
Figure 13:
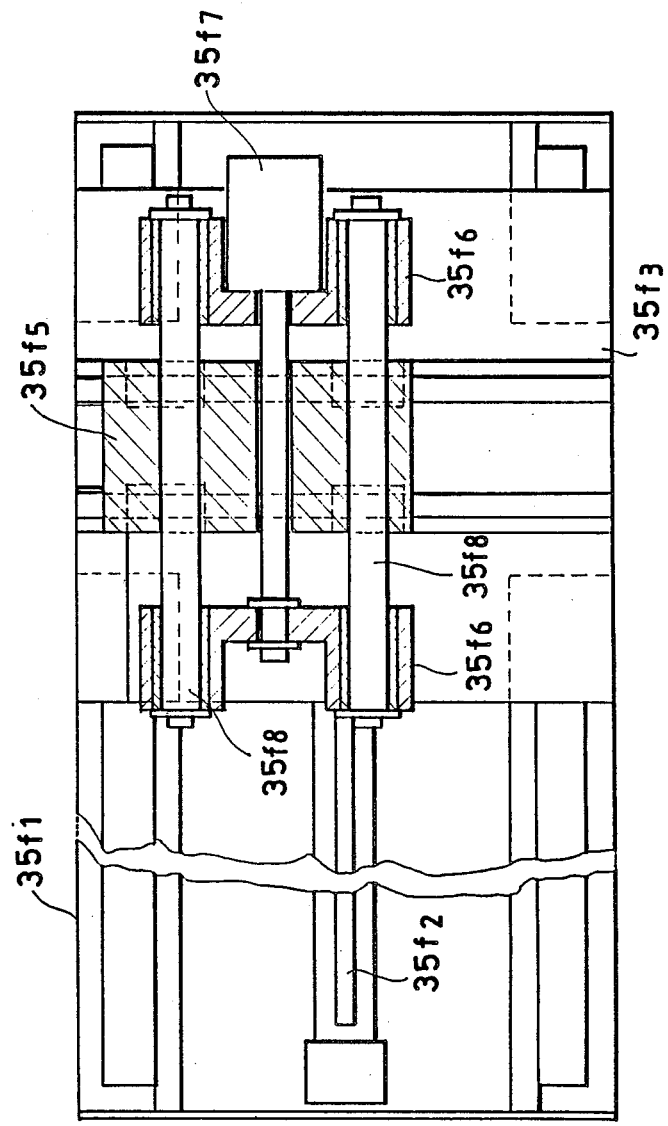
FIG. 13 is a sectional view taken along a line XIII—XIII in FIG. 12.
Figure 14:
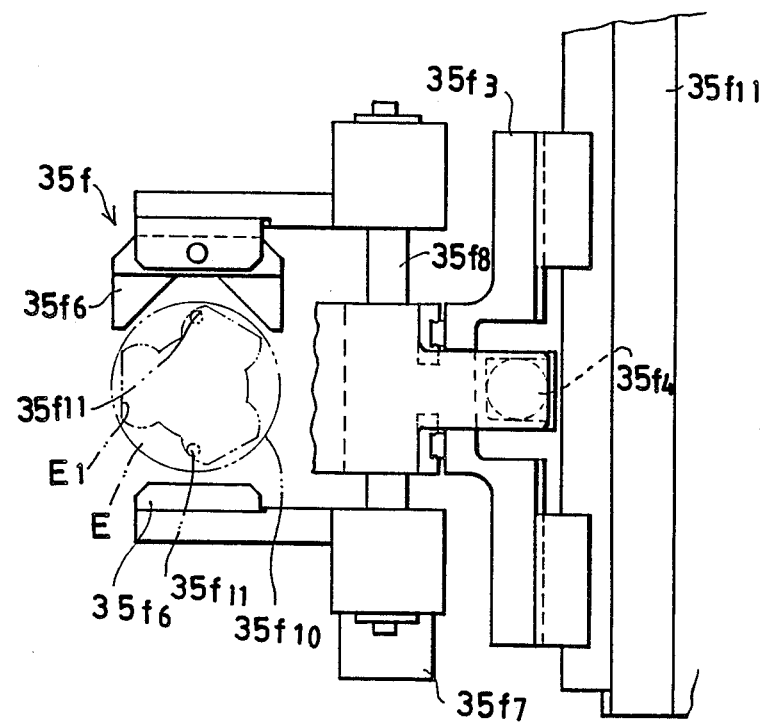
FIG. 14 is a partially out away plan view of the outer member setting means.

The setting means 35f comprises a guide frame $35f_1$ disposed to extend over between above a final end of the conveyor 35a and above the outer setting position, a cylinder $35f_2$, a shift frame $35f_3$ which is mounted on the guide frame $35f_1$ and reciprocated by the cylinder $35f_2$ between a position closer to the conveyor 35a and a position closer to the outer member setting position, as shown in FIGS. 12 to 14, a cylinder $35f_4$, a lift frame $35f_5$ mounted on the shift frame $35f_3$ and lifted by means of the cylinder $35f_4$, a pair of clamp arms $35f_6$ for clamping the outer member E with the clamp arms being mounted on the lift frame $35f_5$ to be opened and closed along a guide bar $35f_8$ by a cylinder $35f_7$, and a phase-adjusting disk $35f_{10}$ which can be turned 360° at a time by a motor $35f_9$ so mounted on the lift frame $35f_5$ as to face the opening of the outer member E.

The phase-adjusting disk $35f_{10}$ has a pair of cushion pins $35f_{11}$ which can project out of, and retreat into, the underside surface thereof and are fitted thereto so that one of them may be engaged with the side wall on one side in the peripheral direction of one of the adjacent roller-rolling grooves E1 on the inner periphery of the outer member E and the other engaged with the side wall on the other side in the peripheral direction of another of the grooves E1.

The outer member E is lifted up to a predetermined delivery position by a cylindrical lifter $35a_1$ adapted to receive the shank of the outer member E at the final end of the conveyor 35a. In this condition, the lift frame $35f_5$ of the setting means 35f is lowered, and the phase-adjusting disk $35f_{10}$ is seated onto the open end of the outer member E and rotated by 360°. This causes each pin $35f_{11}$ to project into the roller-rolling groove E1 in the course of rotation of the disk $35f_{10}$ so that it engages the side wall of the groove. Thereafter, the outer member E is rotated together with the disk and thus adjusted into a phase as shown in FIG. 14.

Then, the clamp arms $35f_6$ are closed to clamp the outer member E and in this state, the lift frame $35f_5$ is raised to move forward the shift frame $35f_3$ toward the outer member setting position. When the outer member assembling jig 4 has been moved to the setting position, the collet 15 in the jig 4 is pushed up and opened by the operation of the cylinder 36 (see FIG. 2) provided below the setting position, and the lift frame $35f_5$ is lowered to set the outer member E on the jig 4. Subsequently, the cylinder 36 is released from the operation to have the collet 15 grip the shank of the outer member E. Thereafter, the clamp arm $35f_6$ are opened and the lift frame 35f5 is then raised to move the slide frame 35f3 back toward the conveyor 35a.

Thus, the outer member E is set in the predetermined phase on the outer member assembling jig 4, and when the jig 4 is moved to the assembling position to raise the outer member E, each roller D can be reliably inserted into each roller-rolling groove E1.

As apparent from the above description, according to the inventive apparatus, the rollers are supplied to the plurality of roller assembling units disposed around the spider by moving the roller setting jig to the assembling position so as to advance it toward the shaft, and then, each roller assembling unit is advanced inwardly in the X-axis direction to assemble each roller to each projection of the spider. Thereafter, the roller setting jig is moved from the assembling position, and the outer member assembling jig is moved to the assembling position and advanced toward the shaft to assemble the outer member to the spider with rollers. Therefore, the combined operation of setting and assembling of the rollers and assembling of the outer member can be automatically performed with a good efficiency without any interference with each other, thus providing an effect leading to an improvement in productivity.

Further, according to the inventive apparatus, the roller setting jig and the outer member assembling jig can be alternately moved to the assembling position by the indexed rotation of the single rotary table, thus bringing about a reduction in size and a simplification of the mechanisms for moving the jigs. In addition, the rollers and the outer member can be automatically supplied to and set on the roller setting jig and the outer member assembling jig in the separate setting positions by the corresponding feeders, thus providing an effect leading to a further improvement in productivity.

Still further, according to the apparatus, the spider can be adjusted in phase by the guide member mounted on the roller setting jig so that each projection thereof may be aligned with the desired X axis and hence, no separate phase-adjusting means is necessary, resulting in a simplified construction of the apparatus. Additionally, the spider can be correctly adjusted in phase by the guide member while the shaft is kept in its centered state, and even when the setting member has been spaced apart from the roller assembling unit by the retreating movement of the jig body resulting from the forward sliding movement of the guide shaft in the axial direction of the shaft relative to the jig body, the guide member attached to the guide shaft can be kept engaged with the spider. The rollers can be assembled while the spider is held to be oriented such that each projection thereof is aligned in phase with the X axis, thus providing an effect leading to ensuring that possible assembling errors relating to the rollers be prevented.

Furthermore, it is possible to have the boot tucked up by the boot mounting unit during assembling of the rollers and the outer member, so as to prevent it from obstructing the assembling operation, and at the same time, it is also possible to automatically fit the boot over the outer member by the boot mounting unit after assembling of the outer member, so as to prevent the falling-off of the outer member.

In addition, the rollers can be smoothly mounted into the roller-rolling groove in the inner periphery of the outer member with their posture maintained to be consistent when the outer member is being assembled. This surely prevents possible assembling errors that may be caused by interference of the outer member with the rollers. Further, according to the roller assembling unit as described, even if the inner member of the roller is tilted when the roller is transferred to the unit, the roller can be reliably centered and so held on the unit, and an improper setting of the rollers on the unit can be prevented.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a roller type universal joint in which a roller is mounted onto each of a plurality of projections provided on an outer periphery of a spider fitted to one end of a shaft having an axis with an axial line and an axial direction and then an outer member is mounted in place around the spider, said apparatus comprising:

an assembling station for setting the shaft in place;

plural roller assembling units mounted at the assembling station disposed at each of plural locations around the spider corresponding to a location aligned with one of X axes, each of said X axes being constituted by a radially extending line with which each projection of the spider is to be aligned;

and a roller setting jig and an outer member assembling jig mounted at the assembling station and alternately movable to an assembling position located on an axial line which is the same as that of the shaft, said roller setting jig including roller jig body movable back and forth along the axial direction of the shaft, means for moving said roller jig body, and a setting member mounted on the jig body having holding portions so disposed at a plurality of locations around said jig and along the X-axis direction as to hold the rollers detachably, said outer member assembling jig including an outer member jig body movable back and forth along the axial direction of the shaft, means for moving said outer member assembly jig, and a chuck member mounted on said outer member jig body for clamping the outer member;

each said roller assembling unit comprising a unit body movable back and forth along the X-axis direction, means for moving said unit body, and a holder means mounted on the unit body for receiving a roller from the roller setting member held by each of the holding portions thereof when the jig body of the roller setting jig is advanced toward the shaft, then centering the roller in such a way as to be aligned with the X-axis and holding it in that centered position.

2. An apparatus for assembling a roller type universal joint according to claim 1, wherein a pair of roller setting jigs and a pair of outer member assembling jigs are disposed alternately on a rotary table so as to have a phase difference of 90 degrees from a neighboring one, said rotary table being index-rotated by 90 degrees at a time, so that both jigs are rotated alternately to the assembling position by the index-rotation of said rotary table;

and there are further provided a roller feeder for feeding and setting a roller to each of the holding portions of the setting member of the roller setting jig that has been rotated to reach a roller setting position, and an outer member setting device for feeding and setting an outer member to the outer member setting jig that has been rotated to reach an outer member setting position, said roller setting position being a rotated position having a phase difference of 90 degrees or 180 degrees with respect to the assembling position and said outer member setting position being another rotated position having a phase difference of 180 degrees or 90 degrees also with respect to the assembling position.

3. An apparatus for assembling a roller type universal joint according to one of claims 1 or 2, wherein there is further provided on the roller jig body of the roller setting jig a guide member which comes into engagement with the spider and make each of the projections thereof align with the X axis when the jig body is advanced toward the shaft.

4. An apparatus for assembling a roller-type universal joint according to claim 3, wherein a guide shaft having a center pin which is engageable with a center hole in an end surface of the shaft and which is inserted in the guide shaft and sinkable against spring force is inserted through the roller jig body of the roller setting jig so as to be slidable forwardly in an axial direction with respect to the jig body, said guide shaft further having the guide member attached thereto.

5. An apparatus for assembling a roller type universal joint according to one of claims 1 or 2, further comprising on the assembling station a boot mounting means for gripping a boot previously assembled to the shaft and for then fitting the diametrically larger portion of the boot over an outer periphery of an open end of the outer member.

6. An apparatus for assembling a roller type universal joint according to claim 1, wherein
said holder means has a roller holder and a pin for centering and holding the roller so as to be aligned with the X axis, said roller holder being mounted on the unit body and slidable along the axial line of the shaft and being provided with a containing portion which permits the projection of the spider to be inserted thereinto from an inward side in the X-axis direction and the roller to be contained therein such a manner as to be withdrawable in the axial direction of the shaft, and the pin being insertable into an inner member of the roller, and also insertable into the containing portion from the outer side in the X-axis direction.

7. An apparatus for assembling a roller type universal joint according to claim 6, further comprising a push rod that can come to abut on an end surface of the inner member of the roller provided on the unit body and movable back and forth in the X-axis direction, and means for moving said push rod, and wherein the pin is fitted to the leading end of the push rod and is urged by a spring inwardly in the X-axis direction.

* * * * *